(No Model.)
S. B. FLEISHER.
TAG.
No. 253,274. Patented Feb. 7, 1882.
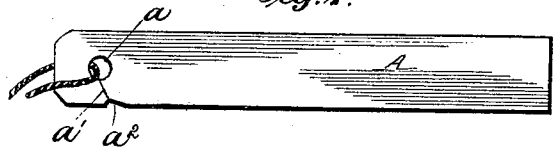
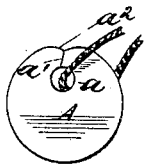
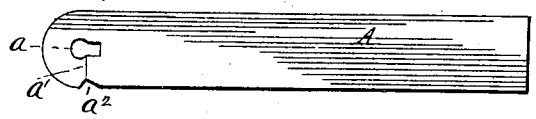
 
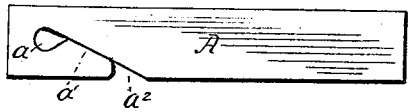
Attest,
Frank K. Knight
J. H. Jacobson
Inventor,
Simon B Fleisher
by Abraham and Mayer
attorneys

UNITED STATES PATENT OFFICE.

SIMON B. FLEISHER, OF PHILADELPHIA, PENNSYLVANIA.

TAG.

SPECIFICATION forming part of Letters Patent No. 253,274, dated February 7, 1882.

Application filed November 25, 1881. (No model.)

*To all whom it may concern:*

Be it known that I, SIMON B. FLEISHER, a citizen of the United States, residing at Philadelphia, in the county of Philadelphia and State of Pennsylvania, have invented a new and useful Improvement in Tags, of which the following is a specification.

My invention relates to improvements in tags; and the object of the improvement is to provide means for slipping tags over threads, worsteds, cords, wires, and other articles where they will hang without any additional loop, ring, or attachment. I attain this object by means of the device illustrated in the accompanying drawings, in which—

Figure 1 represents a tag embodying my improvement attached to a thread. Fig. 2 is a modified form thereof. Figs. 3, 4, 5, 6 show tags of different shapes and of various styles of openings.

Similar letters of reference indicate like parts in each figure.

In Fig. 1, A represents an ordinary quadrangular tag, made preferably of card-board. It is provided with a hole, $a$, from which to one outer edge of the tag is cut a slit, $a'$. Where this slit $a'$ terminates there is a small notch, $a^2$, which acts as a guide for the material when the tag is being attached, as plainly illustrated in Figs. 1, 2, &c.

I do not desire to limit myself to any particular shape of tag, nor to the special configuration of the opening $a$, as it is manifest that these can be varied, as taste or convenience may dictate, without departing from the scope of my invention.

The drawings show several configurations illustrative of some styles which I have found to be useful as tags for hanks of wool by slipping one over one of the strands.

Tags made according to my invention can designate the price, style, and grade of the article, or have any required imprint or illustration.

Having now fully described my invention, what I claim is—

A tag, made of fibrous or analogous material, having an opening, $a$, extending slit $a'$, and notch $a^2$, substantially as described.

SIMON B. FLEISHER.

Witnesses:
 B. F. TELLER,
 L. H. JACOBSON.